US009787209B2

(12) United States Patent
Dighrasker et al.

(10) Patent No.: US 9,787,209 B2
(45) Date of Patent: Oct. 10, 2017

(54) MODULAR THREE PHASE ON-LINE UPS

(75) Inventors: Milind Dighrasker, Bangalore (IN);
Pradeep Tolakanahalli, Bangalore
(IN); Damir Klikic, Waltham, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 412 days.

(21) Appl. No.: 14/378,484

(22) PCT Filed: Feb. 15, 2012

(86) PCT No.: PCT/US2012/025210
§ 371 (c)(1),
(2), (4) Date: Aug. 13, 2014

(87) PCT Pub. No.: WO2013/122581
PCT Pub. Date: Aug. 22, 2013

(65) Prior Publication Data
US 2015/0022003 A1  Jan. 22, 2015

(51) Int. Cl.
*H02M 5/42* (2006.01)
*H02M 7/493* (2007.01)
(Continued)

(52) U.S. Cl.
CPC ............... *H02M 5/42* (2013.01); *H02J 1/102* (2013.01); *H02J 9/061* (2013.01); *H02J 9/062* (2013.01);
(Continued)

(58) Field of Classification Search
None
See application file for complete search history.

(56) References Cited

U.S. PATENT DOCUMENTS 5,745,356 A   4/1998  Tassitino, Jr. et al.
7,005,759 B2  2/2006  Ying et al.
(Continued)

OTHER PUBLICATIONS

Notification of Transmittal of the International Search Report and the Written Opinion of the International Searching Authority from corresponding PCT/US2012/025210 mailed Jun. 22, 2012.
(Continued)

*Primary Examiner* — Rexford Barnie
*Assistant Examiner* — David Shiao
(74) *Attorney, Agent, or Firm* — Lando & Anastasi, LLP

(57) ABSTRACT

An uninterruptible power supply system (UPS) includes an interconnect circuit configured to receive three-phase AC input power from an AC power source and a plurality of UPS subsystems each coupled to the interconnect circuit. A first UPS subsystem includes first and second single-phase AC-to-DC converters. At least one second UPS subsystem includes third and fourth single-phase AC-to-DC converters. In a first mode of operation, the interconnect circuit is configured to conduct at least one phase of the AC input power to the first UPS subsystem and at least one phase of the AC input power to the second UPS subsystem, and, in a second mode of operation, to disconnect the AC input power from the first UPS subsystem and to conduct at least one phase of the AC input power to the second UPS subsystem.

19 Claims, 4 Drawing Sheets

(51) Int. Cl.
   *H02J 9/06*     (2006.01)
   *H02M 7/04*    (2006.01)
   *H02J 1/10*     (2006.01)
   *H02J 3/26*     (2006.01)
(52) U.S. Cl.
   CPC ............. *H02M 7/04* (2013.01); *H02M 7/493*
         (2013.01); *H02J 3/26* (2013.01); *Y02E 40/50*
         (2013.01); *Y02P 80/14* (2015.11); *Y10T 307/62*
                                                      (2015.04)

(56) References Cited

U.S. PATENT DOCUMENTS

| | | | |
|---|---|---|---|
| 7,259,477 B2 | 8/2007 | Klikic et al. | |
| 2005/0162137 A1 | 7/2005 | Tracy et al. | |
| 2006/0167569 A1* | 7/2006 | Colombi | H02J 3/005 700/22 |
| 2007/0228837 A1* | 10/2007 | Nielsen | H02J 9/062 307/82 |
| 2008/0067872 A1 | 3/2008 | Moth | |
| 2009/0212631 A1* | 8/2009 | Taylor | H02J 9/062 307/66 |
| 2009/0267417 A1* | 10/2009 | Lee | H02J 9/062 307/65 |
| 2010/0013311 A1* | 1/2010 | Groff | H02J 9/061 307/66 |
| 2010/0026093 A1 | 2/2010 | Bleus | |
| 2010/0091529 A1 | 4/2010 | Jakeman et al. | |
| 2010/0315849 A1* | 12/2010 | Ingemi | H02J 9/062 363/89 |
| 2011/0044077 A1* | 2/2011 | Nielsen | H02J 9/062 363/37 |

OTHER PUBLICATIONS

Australian Patent Examination Report from corresponding Australian Patent Application No. 2012369989 dated Apr. 7, 2016.
Supplementary European Search Report from corresponding European Application No. 12868553.4 dated Jul. 17, 2015.

* cited by examiner

MODULAR THREE PHASE ON-LINE UPS

This application is a U.S. National Stage Application and claims priority under 35 U.S.C. §371 of International Application No. PCT/US2012/025210, filed Feb. 15, 2012, which is hereby incorporated herein by reference in its entirety.

BACKGROUND OF THE INVENTION

1. Field of Invention

Embodiments of the invention relate generally to operation of uninterruptible power supply systems.

2. Discussion of Related Art

An uninterruptible power supply (UPS) is typically used to provide backup power to an electrical device, or load, while the primary power source, or mains, is unavailable. A conventional online UPS rectifies input power provided by an electric utility using a power factor correction circuit (PFC) to provide a DC voltage to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is always powered either by mains or the battery, the output power of the UPS is uninterrupted if the mains fails and the battery is sufficiently charged.

Some conventional UPS systems with three-phase AC input use only a single PFC converter for all three input phases through a front end diode bridge rectifier. As a result, these conventional UPS systems with three phase input have the disadvantage of poor input power factor, high input current distortion and poor efficiency. Further, some conventional high power UPS systems require a split battery input to achieve charging of the negative DC bus, which makes the system costly, less flexible and complex. Additionally, some conventional high power UPS systems do not have flexibility in terms of scaling the output power of the UPS and connecting an appropriate input, e.g., the ability to convert high power with three phase input and low power with single phase input.

SUMMARY OF THE INVENTION

According to one embodiment, an uninterruptible power supply (UPS) system includes an interconnect circuit configured to receive three-phase AC input power from a three-phase AC power source, a first UPS subsystem coupled to the interconnect circuit and having a first single-phase AC-to-DC converter, a second single-phase AC-to-DC converter and a first output configured to provide a first single-phase AC output power, at least one second UPS subsystem coupled to the interconnect circuit and having a third single-phase AC-to-DC converter, a fourth single-phase AC-to-DC converter and a second output configured to provide a second single-phase AC output power, and a third output coupled to the first output and the second output. The first UPS subsystem is configured to convert at least one phase of the three-phase AC input power into the first single-phase AC output power. The second UPS subsystem(s) is/are configured to convert at least one phase of the three-phase AC input power into the second single-phase AC output power. The third output is configured to provide a combination of the first single-phase AC output power and the second single-phase AC output power to a load.

In a first mode of operation, the interconnect circuit is configured to conduct at least one phase of the three-phase AC input power to the first UPS subsystem and at least one phase of the three-phase AC input power to the at least one second UPS subsystem. In a second mode of operation, the interconnect circuit is configured to disconnect the three-phase AC input power from the first UPS subsystem and to conduct at least one phase of the three-phase AC input power to the at least one second UPS subsystem.

In another embodiment, in the first mode of operation, the interconnect circuit may be configured to conduct, to the first UPS subsystem, a first phase of the three-phase AC input power and a second phase of the three-phase AC input power that is different than the first phase of the three-phase AC input power. The interconnect circuit may be further configured to conduct, to the at least one second UPS subsystem, the second phase of the three-phase AC input power and a third phase of the three-phase AC input power that is different than each of the first and second phases of the AC input power.

In another embodiment, the first single-phase AC-to-DC converter and the second single-phase AC-to-DC converter may each be configured to operate independently of each of the third single-phase AC-to-DC converter and the fourth single-phase AC-to-DC converter.

In another embodiment, the UPS system may further include a controller configured to detect a failure of the first UPS subsystem and operate the UPS system in the second mode of operation responsive to detecting the failure of the first UPS subsystem.

In another embodiment, the UPS system may further include a DC power source. The first UPS subsystem may include a first input coupled to the first single-phase AC-to-DC converter and a second input coupled to the second single-phase AC-to-DC converter. The at least one second UPS subsystem may include a third input coupled to the third single-phase AC-to-DC converter and a fourth input coupled to the fourth single-phase AC-to-DC converter. The interconnect circuit may be configured to switchably connect the first input of the first UPS subsystem to the DC power source and/or at least one phase of the three-phase AC input power. The interconnect circuit may be further configured to switchably connect the second input of the first UPS subsystem to the DC power source and/or at least one phase of the three-phase AC input power. The interconnect circuit may be further configured to switchably connect the third input of the at least one second UPS subsystem to the DC power source and/or at least one phase of the three-phase AC input power. The interconnect circuit may be further configured to switchably connect the fourth input of the at least one second UPS subsystem to the DC power source and/or at least one phase of the three-phase AC input power.

In another embodiment, the first output and the second output may be coupled to each other in parallel. In another embodiment, the first UPS subsystem may include a first double-conversion UPS. The at least one second UPS subsystem may includes a second double-conversion UPS.

According to one embodiment, an uninterruptible power supply (UPS) system includes a first UPS subsystem having a first input, a second input, a first single-phase AC-to-DC converter coupled to the first input, and a second single-phase AC-to-DC converter coupled to the second input. The UPS further includes a second UPS subsystem having a third input, a fourth input, a third single-phase AC-to-DC converter coupled to the third input, and a fourth single-phase AC-to-DC converter coupled to the fourth input. The UPS further includes a first relay coupled to the first input and configured to be coupled to a first phase of a three-phase AC power source, a second relay coupled to the second input and configured to be coupled to a second phase of the three-phase AC power source, a third relay coupled to the third input and configured to be coupled to the second phase of the three-phase AC power source, a fourth relay coupled to the fourth input and configured to be coupled to a third phase of the three-phase AC power source, a first switch coupled at one end to a first point between the first relay and the first input, and at an opposite end to a second point between the second relay and the second input, and a second switch coupled at one end to a third point between the third relay and the third input, and at an opposite end to a fourth point between the fourth relay and the fourth input.

In another embodiment, the UPS system may further include a fifth relay interposed between the first input and the first switch, a sixth relay interposed between the second input and the first switch, a seventh relay interposed between the third input and the second switch, and an eighth relay interposed between the fourth input and the second switch.

In another embodiment, the UPS system may further include a DC power source. The fifth relay may be configured to switchably couple the first single-phase AC-to-DC converter to the first input and/or the DC power source. The sixth relay may be configured to switchably couple the second single-phase AC-to-DC converter to the second input and/or the DC power source. The seventh relay may be configured to switchably couple the third single-phase AC-to-DC converter to the third input and/or the DC power source. The eighth relay may be configured to switchably couple the fourth single-phase AC-to-DC converter to the fourth input and/or the DC power source.

In another embodiment, the UPS system may further include a controller coupled to the first, second, third, fourth, fifth, sixth, seventh and eighth relays, the first and second switches, and the first and second UPS subsystems. In a first mode of operation, the controller may be configured to close the first, second, third, and fourth relays to provide at least one phase of the three-phase AC input power to the first, second, third and fourth inputs, respectively. The controller may be further configured to switch the fifth relay to couple the first single-phase AC-to-DC converter to the first input, switch the sixth relay to couple the second single-phase AC-to-DC converter to the second input, switch the seventh relay to couple the third single-phase AC-to-DC converter to the third input, switch the eighth relay to couple the fourth single-phase AC-to-DC converter to the fourth input, and open the first switch and the second switch. In a second mode of operation, the controller may be configured to open the first, second and third relays, open the first switch, close the fourth relay, and close the second switch. In yet another embodiment, in a third mode of operation, the controller may be configured to open the first and second relays, open the first and second switches, and close the third and fourth relays. In yet another embodiment, the controller may be further configured to detect a failure of the first UPS subsystem and operate the UPS system in the second or third mode of operation in response to detecting the failure of the first UPS subsystem.

In another embodiment, the UPS system may further include a third switch coupled at one end to the second point and at an opposite end to the third point. In yet another embodiment, the UPS system may further include a controller coupled to the first, second, third, fourth, fifth, sixth, seventh and eighth relays, the first, second and third switches, and the first and second UPS subsystems. In a first mode of operation, the controller may be configured to close the first relay and close the first, second and third switches to provide one phase of the three-phase AC input power to the first, second, third and fourth inputs, respectively. The controller may be further configured to switch the fifth relay to couple the first single-phase AC-to-DC converter to the first input, switch the sixth relay to couple the second single-phase AC-to-DC converter to the second input, switch the seventh relay to couple the third single-phase AC-to-DC converter to the third input, switch the eighth relay to couple the fourth single-phase AC-to-DC converter to the fourth input. In a second mode of operation, the controller may be configured to open the first, second and third relays, open the third switch, close the fourth relay, and close the second switch.

In another embodiment, the first single-phase AC-to-DC converter may include a first 3.33 KW AC-to-DC converter, the second single-phase AC-to-DC converter may include a first 1.66 KW AC-to-DC converter, the third single-phase AC-to-DC converter may includes a second 1.66 KW AC-to-DC converter, and the fourth single-phase AC-to-DC converter may include a second 3.33 KW AC-to-DC converter.

In another embodiment, the first UPS subsystem may include a first 5 KW inverter coupled to the first and second single-phase AC-to-DC converters. The second UPS subsystem may include a second 5 KW inverter coupled to the third and fourth single-phase AC-to-DC converters.

According to one embodiment, a method of controlling an uninterruptible power supply (UPS) system includes connecting one phase of a three-phase AC input power to a first single-phase AC-to-DC converter of a first UPS subsystem, connecting one phase of the three-phase AC input power to a second single-phase AC-to-DC converter of the first UPS subsystem, connecting one phase of the three-phase AC input power to a third single-phase AC-to-DC converter of a second UPS subsystem, connecting one phase of the three-phase AC input power to a fourth single-phase AC-to-DC converter of the second UPS subsystem, converting the three-phase AC input power into a single-phase AC output power using each of the first, second, third and fourth AC-to-DC converters, detecting a failure of the first UPS subsystem, and responsive to detecting the failure of the first UPS subsystem, disconnecting the three-phase AC input power from each of the first single-phase AC-to-DC converter and the second single-phase AC-to-DC converter and converting at least one phase of the three-phase AC input power into the single-phase AC output power using each of the third and fourth single-phase AC-to-DC converters.

In another embodiment, the method may further include connecting a first phase of the three-phase AC input power to the first single-phase AC-to-DC converter, connecting a second phase of the three-phase AC input power that is different than the first phase of the three-phase AC input power to the second single-phase AC-to-DC converter, connecting the second phase of the three-phase AC input power to the third single-phase AC-to-DC converter, and connecting a third phase of the three-phase AC input power that is different than each of the first and second phases of the AC input power to the fourth single-phase AC-to-DC converter.

In another embodiment, the method may further include, responsive to detecting the failure of the first UPS subsystem, connecting at least one of the first phase of the three-phase AC input power and the second phase of the three-phase AC input power to each of the third single-phase AC-to-DC converter and the fourth single-phase AC-to-DC converter. In yet another embodiment, the method may further include connecting one phase of the three-phase AC input power to each of the first, second, third and fourth single-phase AC-to-DC converters.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
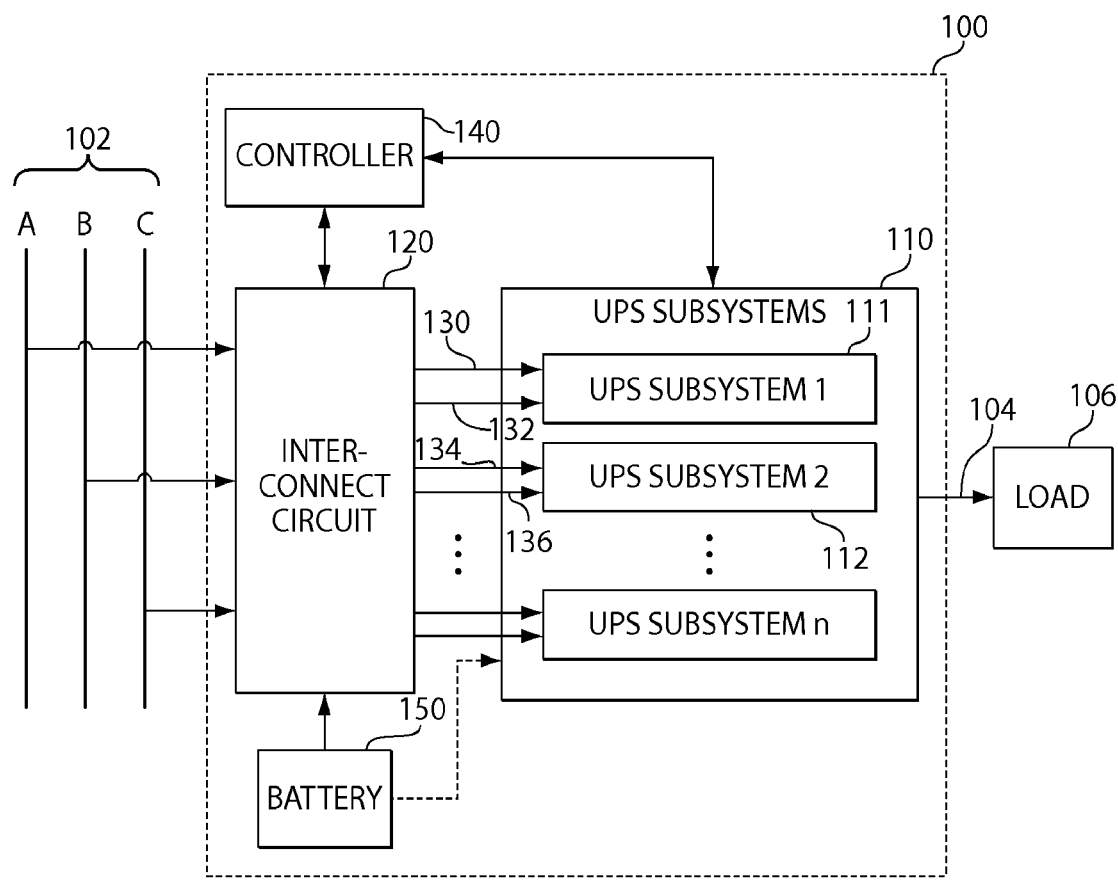
FIG. 1 is a block diagram of one example of an uninterruptible power supply in accordance with one embodiment.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments relate to power conversion in a UPS; however, embodiments of the invention are not limited for use in uninterruptible power supplies and may be used with other power supplies or other power systems generally. Further, while at least some examples below describe uses with respect to online UPS's, some embodiments can be used with other types of UPS's.

FIG. 1 is a block diagram of an example of a UPS system 100, according to one embodiment. The UPS system 100 is configured to be coupled to a polyphase AC power source, such as a three-phase AC input 102 including phases A, B and C. The UPS system 100 is further configured to convert one or more phases A, B, C of the AC input 102 into single-phase AC power at an output 104. A load 106 may be coupled to the output 104.

The UPS system 100 includes a plurality of UPS subsystems 110 each coupled to an interconnect circuit 120. The interconnect circuit 120 is coupled to each phase A, B, C of the AC input 102, and, in general, acts to interconnect each phase A, B, C of the AC input 102 to the plurality of UPS subsystems 110. In one embodiment, the plurality of UPS subsystems 110 include at least two UPS subsystems 111 and 112, although it will be understood that any number n of UPS subsystems may be used in combination with UPS subsystems 111 and 112. The first UPS subsystem 111 includes two inputs 130, 132 each coupled to the interconnect circuit 120. Similarly, the second UPS subsystem 112 includes two inputs 134, 136 each coupled to the interconnect circuit 120. Each of the inputs 130, 132, 134, 136 are configured to conduct one phase (e.g., A, B or C) of the AC input 102 as provided by the interconnect circuit 120 to the respective input 130, 132, 134, 136. The UPS system 100 further includes a controller 140 coupled to the UPS subsystems 110 and/or the interconnect circuit 120, and a battery 150 or other DC power source coupled to the UPS subsystems 110 and/or the interconnect circuit 120.

In general, each UPS subsystem 111, 112 is configured to convert one or more of the phases A, B, C of the AC input 102 into at least a portion of the single-phase AC power at the output 104. The outputs of each UPS subsystem 110 (not shown) are coupled together in parallel to the output 104 of the UPS system 100. For example, UPS subsystem 111 may include a two-phase converter configured to convert phases A and B of the AC input 102 into at least a portion of the AC power at the output 104, and UPS subsystem 112 may include another two-phase converter configured to convert phases B and C of the AC input 102 into another portion of the AC power at the output 104. Alternatively, each UPS subsystem 111, 112 may be configured to convert a single phase of the AC input 102 (e.g., phase A, B or C) into the AC power at the output 104. The interconnect circuit 120 can be controlled (e.g., by the controller 140) to selectively interconnect one phase A, B, C of the AC input 102 to each input 130, 132, 134, 136 of the UPS subsystems 111, 112, respectively, as will be described in further detail below. In one embodiment, the interconnect circuit 120 can be further controlled to couple the battery 150 to one or more of the inputs 130, 132, 134, 136. In another embodiment, the battery 150 can be coupled directly to any of the UPS subsystems 110 through one or more relays, such as relays 191-197 described below with respect to FIGS. 2, 3 and 4.

In one embodiment, each of the plurality of UPS subsystems 110 (e.g., UPS subsystem 111 and 112) is a modular component that can be added to, or removed from, the interconnect circuit 120 to increase or decrease the total power output capacity of the UPS system 100. For example, the UPS system 100 may include two, three, four or more similarly constructed UPS subsystems, each being interconnected to the AC input 102 via the interconnect circuit 120 and each having their respective outputs coupled in parallel to each other.

Figure 2:
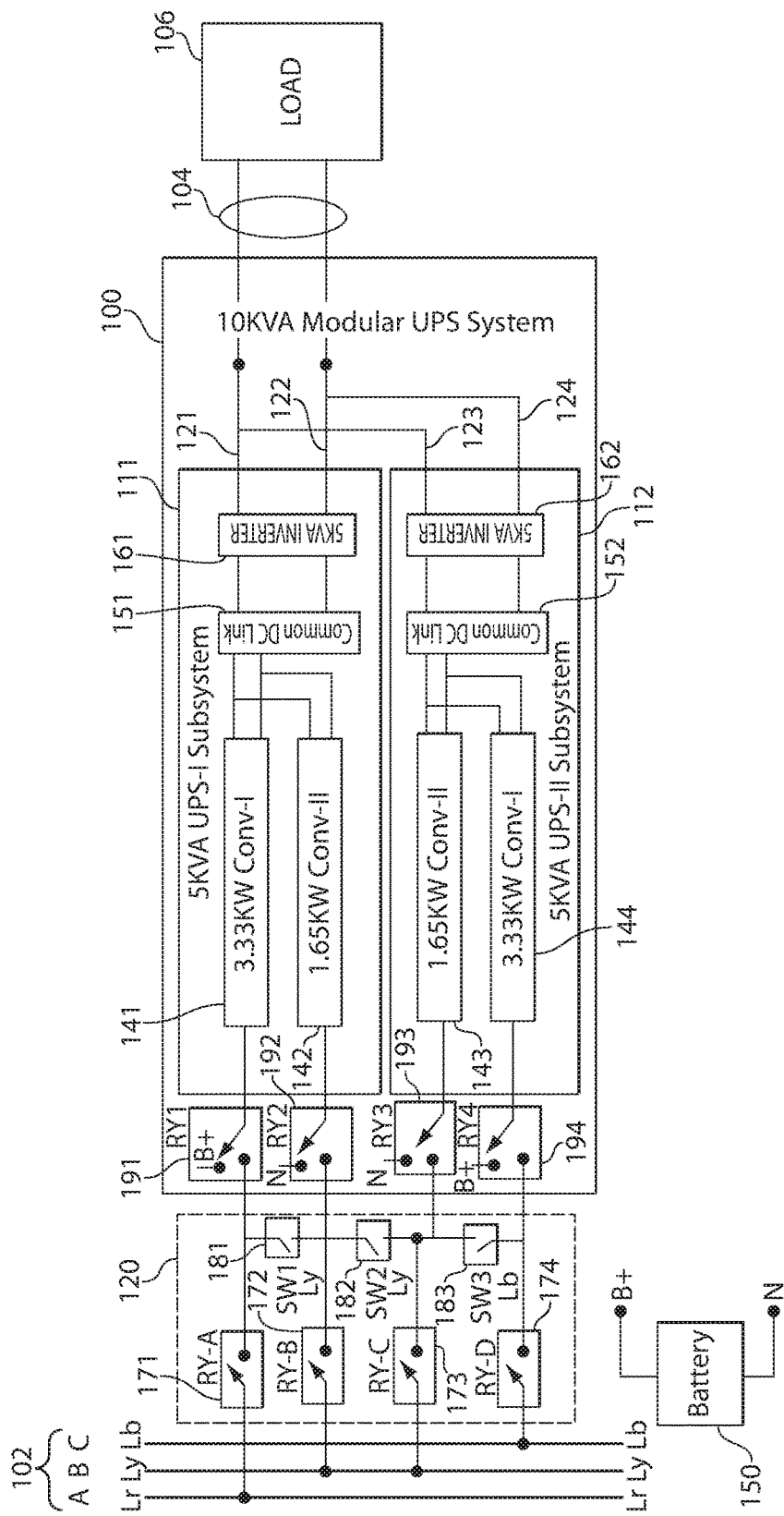
FIG. 2 is a block diagram of another example of an uninterruptible power supply in accordance with one embodiment.

FIG. 2 is a block diagram of the UPS system 100, according to one embodiment. The embodiment shown in FIG. 2 includes two two-phase UPS subsystems 111, 112. UPS subsystem 111 includes two outputs, a line output 121 and a neutral output 122, and UPS subsystem 112 includes two outputs, a line output 123 and a neutral output 124. The line outputs 121 and 123 are coupled together in parallel, as are the neutral outputs 122 and 124, to output 104. As discussed above, the load 106 may be coupled to the output 104.

Each of the UPS subsystems 111, 112 include two single-phase converters (e.g., AC-to-DC power factor correction converters). UPS subsystem 111 includes single-phase converters 141 and 142 that are each coupled to a common DC bus 151. The DC bus 151 is further coupled to an inverter circuit 161. In one example, the UPS subsystem 111 may be configured to generate 5 KW at the outputs 121, 122 using a 3.33 KW converter (e.g., converter 141) and a 1.65 KW converter (e.g., converter 142). Similarly, UPS subsystem 112 includes single-phase converters 143 and 144 that are each coupled to another common DC bus 152. The DC bus 152 is further coupled to another inverter circuit 162. In this example, UPS subsystem 112 may similarly be configured to generate 5 KW at the outputs 123, 124 using another 1.65 KW converter (e.g., converter 143) and another 3.33 KW converter (e.g., converter 144). Since the outputs 121, 123 and 122, 124 are coupled in parallel, the total power output of the UPS 100 at the output 104 is up to 10 KW (i.e., 5 KW per UPS subsystem), depending on the operating mode of the UPS 100, which is described below.

In the embodiment of FIG. 2, the interconnect circuit 120 includes a plurality of relays 171, 172, 173, 174 each coupled to one phase A, B or C of the AC input 102. For example, relay 171 is coupled to phase A, relay 172 is coupled to phase B, relay 173 is also coupled to phase B, and relay 174 is coupled to phase C. The interconnect circuit 120 further includes a plurality of switches 181, 182, 183. Switch 181 is coupled between relay 171 and relay 172, switch 182 is coupled between relay 172 and relay 173, and switch 183 is coupled between relay 173 and relay 174. Although in FIG. 2 the interconnect circuit 120 is shown separate from the UPS 100, in some embodiments the interconnect circuit 120 may be included within the UPS 100, such as described with respect to FIG. 1.

The UPS 100 of FIG. 2 further includes a plurality of relays 191, 192, 193, 194 each coupled to a respective one of the converters 141, 142, 143, 144, to the interconnect circuit 120, and to the battery 150. Although in FIG. 2 the relays 191, 192, 193, 194 are shown within the UPS 100, in some embodiments relays 191, 192, 193, 194 may be included within the interconnect circuit 120.

The UPS 100 of FIG. 2 is configured such that each UPS subsystem 111, 112 shares generation of the total output power equally. For example, as described above, UPS subsystem 111 generates 5 KW and UPS subsystem 112 generates another 5 KW, for a total power output of 10 KW when both UPS subsystems 111, 112 are operational. When operating in line mode (i.e., drawing power from the AC input 102), the 10 KW output power can be derived from all three phases A, B, C of the AC input 102 or from a single phase (e.g., A, B or C) of the AC input 102. When operating in backup mode (i.e., drawing power from the battery 150), the 10 KW output power can be derived from the battery 150. To achieve the above-described conditions, the interconnect circuit 120 may be controlled, for example, as shown in Table 1 below to selectively couple each of the UPS subsystems 111, 112 to one or more phases A, B, C of the AC input 102.

B is distributed equally across the two UPS subsystems 111, 112 (1.66 KW on each UPS subsystem 111, 112) while the load on phases A and C, respectively, are 3.33 KW for each UPS subsystem 111, 112. It will be understood that the control configurations shown in Table 1 describe one non-limiting example of how the interconnection circuit 120 may be configured to achieve various operating conditions of the UPS 100, and that other configurations not shown in Table 1 are possible. For example, converters 142 and 143 may be coupled to phase A or C instead of phase B, and converters 141 and 144 may be coupled to one of the two other phases not coupled to converters 142 and 143.

The UPS 100 is also configured to provide partial power supply redundancy at the output 104 if one of the UPS subsystems 111 or 112 fails. Failure of any of the UPS subsystems 110 may be detected, for example, by the controller 140 (see FIG. 1). For example, if UPS subsystem 111 fails, the UPS 100 can provide 5 KW of output power (i.e., half of the total output capacity of the UPS 100) using only UPS subsystem 112. In one example, when only UPS subsystem 112 is operational, relays 171, 172 and 173 and switches 181 and 182 are open, disconnecting UPS subsystem 111 from the AC input 102 (i.e., UPS subsystem 111 will not generate any output power in this configuration). Relay 174 and switch 183 are closed to conduct phase C of the AC input 102 to converters 143 and 144 only. Thus, UPS subsystem 112 generates the AC output 104 using only one phase of the AC input 102. It will be understood that any phase A, B, C of the AC input 102 may be used, depending on the particular configuration of the interconnect circuit 120. In another example, also shown in Table 1, relays 173 and 174 are closed, and switches 181, 182, 183 are open, to conduct phases B and C of the AC input 102 to converters 143 and 144 only. Thus, UPS subsystem 112 generates the AC output 104 using two phases of the AC input 102. Again, it will be understood that any two phases A, B, C of the AC input 102 may be used.

As shown in Table 1 above, the relays 171, 172, 173, 174 and switches 181, 182, 183 can be configured in various combinations to configure the UPS 100 for operation in various modes (e.g., a mode in which all UPS subsystems

TABLE 1

Three-phase input, single-phase output, two UPS subsystems.

| | Relay 171 | Relay 172 | Relay 173 | Relay 174 | Switch 181 | Switch 182 | Switch 183 |
|---|---|---|---|---|---|---|---|
| UPS subsystems 111 & 112 | C | C | C | C | O | C | O |
| UPS subsystem 112 only (using 1 phase input) | O | O | O | C | O | O | C |
| UPS subsystem 112 (using 2 phase input) | O | O | C | C | O | O | O |

C = Closed; O = Open.

In the example shown in Table 1, and with reference to FIG. 2, when both UPS subsystems 111 and 112 are operational, relay 171 is closed to conduct phase A of the AC input 102 to converter 141, relay 172 is closed to conduct phase B of the AC input 102 to converter 142, relay 173 is closed to conduct phase B of the AC input 102 to converter 143, and relay 174 is closed to conduct phase C of the AC input 102 to converter 144. When configured in the manner described in Table 1, each phase A, B, C of the AC input 102 is equally loaded (i.e., 3.33 KW per phase), although the load on phase 110 are operational, or another mode in which one of the UPS subsystems 110 has failed or is otherwise inoperable). Table 2 shows the total power output by the UPS 100 in several exemplary modes of operation when drawing power from one or more phases A, B, C of the AC input 102. In a first mode of operation, both UPS subsystems 111 and 112 are operational and three phases of the AC input 102 are used; in a second mode of operation, only UPS subsystem 112 is operational and only two phases of the AC input 102 are used.

TABLE 2

Total power output for UPS having two 5 KVA subsystems, three-phase input.

|  | UPS subsystems 111 & 112 operational | | | UPS subsystem 112 only operational (1 phase input) | | |
| --- | --- | --- | --- | --- | --- | --- |
| UPS 100 Output Power | Phase A Power | Phase B Power | Phase C Power | Phase A Power | Phase B Power | Phase C Power |
| UPS subsystem 111 power output | 3.33 KW | 1.66 KW | 0 | 0 | 0 | 0 |
| UPS subsystem 112 power output | 0 | 1.66 KW | 3.33 KW | 0 | 0 | 5 KW |
| Total load/phase | 3.33 KW | 3.33 KW | 3.33 KW | 0 | 0 | 5 KW |
| Total output | | 10 KW | | | 5 KW | |

|  | UPS subsystem only 112 operational (2 phase input) | | |
| --- | --- | --- | --- |
| UPS 100 Output Power | Phase A Power | Phase B Power | Phase C Power |
| UPS subsystem 111 power output | 0 | 0 | 0 |
| UPS subsystem 112 power output | 0 | 1.66 KW | 3.33 KW |
| Total load/phase | 0 | 1.66 KW | 3.33 KW |
| Total output | | 5 KW | |

The UPS 100 of FIG. 2 can be further configured to operate in single-phase AC input operation, as shown in Table 3 below.

TABLE 3

Single-phase input (Phase C), single-phase output.

|  | Relay 171 | Relay 172 | Relay 173 | Relay 174 | Switch 181 | Switch 182 | Switch 183 |
| --- | --- | --- | --- | --- | --- | --- | --- |
| UPS subsystems 111 & 112 | O | O | O | C | C | C | C |

C = Closed; O = Open.

In the configuration described in Table 3, relay 174 is closed while switches 181, 182 and 183 are also closed. This enables the interconnect circuit 120 to conduct phase C of the AC input 102 to all four converters 141, 142, 143, 144. It will be understood that by using different configurations of the interconnect circuit 120, single-phase operation of the UPS 100 can draw power from any phase A, B or C of the AC input 102.

Table 4 below shows the total power output by the UPS 100 when operating in single-phase AC input operation, such as described with respect to Table 3.

TABLE 4

Total power output for UPS having two 5 KVA subsystems, single phase input.

|  | UPS subsystems 111 & 112 operational | | |
| --- | --- | --- | --- |
| UPS 100 Output Power | Phase A Power | Phase B Power | Phase C Power |
| UPS subsystem 111 power output | 0 | 0 | 5 KW |
| UPS subsystem 112 power output | 0 | 0 | 5 KW |
| Total load/phase | 0 | 0 | 10 KW |
| Total output | | | 10 KW |

To operate the UPS 100 in backup mode (i.e., drawing power from the battery 150), relays 191, 192, 193, 194 are switched to battery connections B+ and N, thus conducting power from the battery 150 to UPS subsystems 141, 142, 143, 144.

Figure 3:
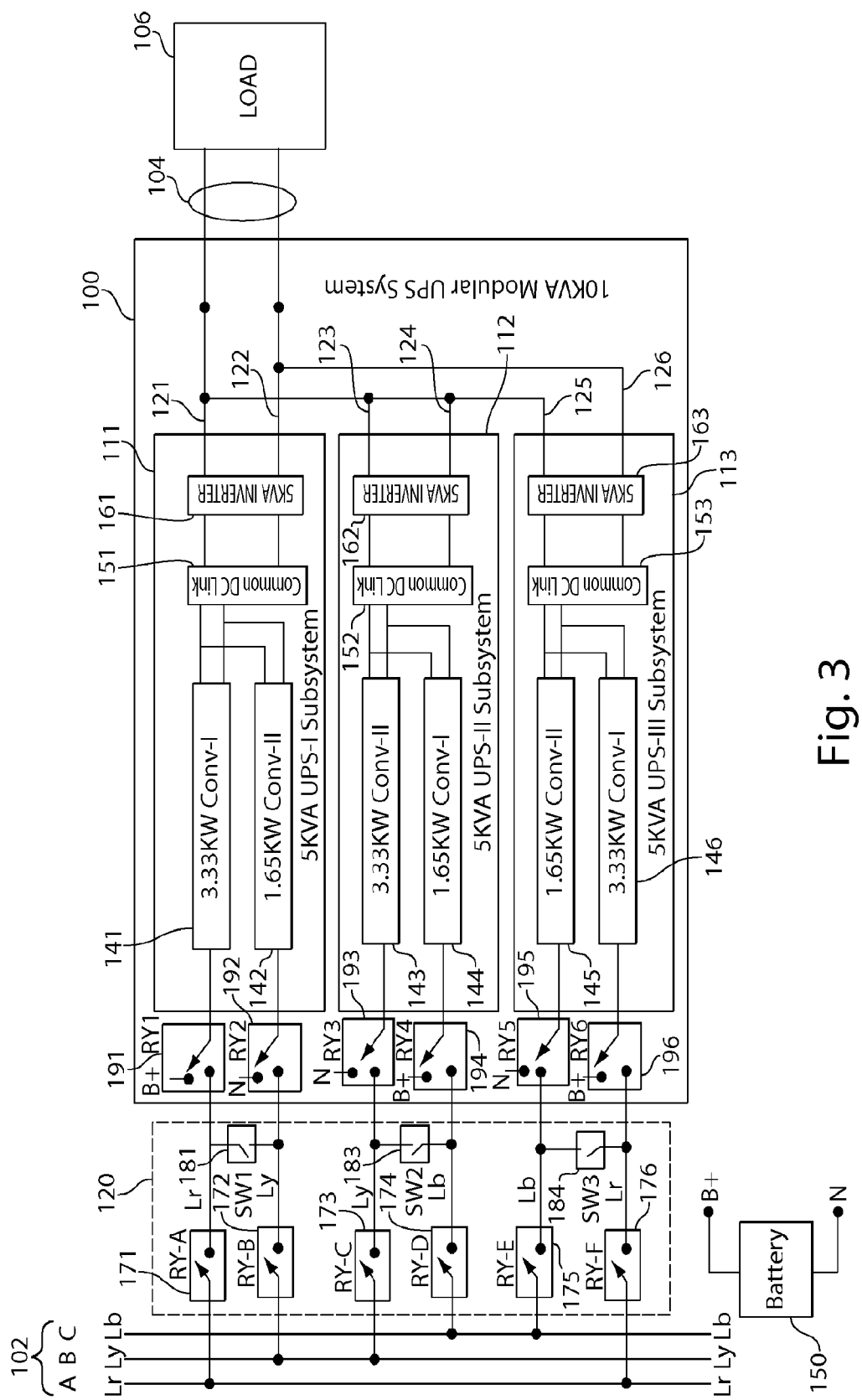
FIG. 3 is a block diagram of yet another example of an uninterruptible power supply in accordance with one embodiment.

FIG. 3 is a block diagram of the UPS system 100, according to another embodiment. The embodiment of FIG. 3 is similar to the embodiment of FIG. 2, except that the UPS system 100 includes three UPS subsystems 111, 112, 113 instead of two UPS subsystems 111, 112, as described above with respect to FIG. 2. UPS subsystem 113 includes two outputs, a line output 125 and a neutral output 126. The line outputs 121, 123 and 125 are coupled together in parallel, as are the neutral outputs 122, 124 and 126 to output 104. As discussed above, the load 106 may be coupled to the output 104.

Each of the UPS subsystems 111, 112, 113 includes two single-phase converters (e.g., AC-to-DC power factor correction converters). Similar to the UPS subsystems 111, 112 described above with respect to FIG. 2, UPS subsystem 113 includes single-phase converters 145 and 146 that are each coupled to a common DC bus 153. The DC bus 153 is further coupled to an inverter circuit 163. In one example, the UPS subsystem 113 may be configured to generate 5 KW at the outputs 125, 126 using a 3.33 KW converter (e.g., converter 146) and a 1.65 KW converter (e.g., converter 145). Since the outputs 121, 123, 125 and 122, 124, 126 are coupled in parallel, the total power output of the UPS 100 at the output 104 is up to 15 KW (i.e., 5 KW per UPS subsystem), depending on the operating mode of the UPS 100, which is described below.

In the embodiment of FIG. 3, the interconnect circuit 120 includes relays 175, 176 each coupled to one phase A, B or C of the AC input 102, in addition to relays 171, 172, 173, 174 as described above with respect to the embodiment of FIG. 2. For example, relay 175 is coupled to phase C and relay 176 is coupled to phase A. The interconnect circuit 120 further includes switch 184 in addition to switches 181 and 183 (but not switch 182) as described above with respect to FIG. 2. Switch 184 is coupled between relay 175 and relay 176. Although in FIG. 3 the interconnect circuit 120 is shown separate from the UPS 100, in some embodiments the interconnect circuit 120 may be included within the UPS 100, such as described with respect to FIG. 1.

The UPS 100 of FIG. 3 further includes relays 195, 196 in addition to relays 191, 192, 193, 194 as described above with respect to FIG. 2. Relays 195, 196 are each coupled to a respective one of the converters 145, 146, to the interconnect circuit 120, and to the battery 150. Although in FIG. 3 the relays 191, 192, 193, 194, 195, 196 are shown within the UPS 100, in some embodiments relays 191, 192, 193, 194, 195, 196 may be included within the interconnect circuit 120.

The UPS 100 of FIG. 3 is configured such that each UPS subsystem 111, 112, 113 shares generation of the total output power equally. For example, as described above, UPS subsystem 111 generates 5 KW, UPS subsystem 112 generates another 5 KW, and UPS subsystem 113 generates another 5 KW for a total power output of 15 KW when UPS subsystems 111, 112, 113 are all operational. When operating in line mode (i.e., drawing power from the AC input 102), the 15 KW output power can be derived from all three phases A, B, C of the AC input 102. When operating in backup mode (i.e., drawing power from the battery 150), the 15 KW output power can be derived from the battery 150. To achieve the above-described conditions, the interconnect circuit 120 may be controlled, for example, as shown in Table 5 below to selectively couple the UPS 100 to the AC input 102.

switch 181 is closed to conduct phase A of the AC input 102 to converter 142 (relay 172 is open), relay 173 is closed to conduct phase B of the AC input 102 to converter 143, switch 183 is closed to conduct phase B of the AC input 102 to converter 144 (relay 174 is open), relay 175 is closed to conduct phase C of the AC input 102 to converter 145, and switch 184 is closed to conduct phase C of the AC input 102 to converter 146 (relay 176 is open). When configured in the manner described in Table 5, each phase A, B, C of the AC input 102 is equally loaded (i.e., 3.33 KW each) across the three UPS subsystems 111, 112, 113. It will be understood that the control configurations shown in Table 5 describes one non-limiting example of how the interconnection circuit 120 may be configured to achieve various operating conditions of the UPS 100, and that other configurations not shown in Table 5 are possible.

The UPS 100 is also configured to provide partial power supply redundancy at the output 104 if one of the UPS subsystems 111, 112 or 113 fails. For example, if UPS subsystem 111 fails, the UPS 100 can provide 10 KW of output power (i.e., two-thirds of the total output capacity of the UPS 100) using only UPS subsystems 112, 113. When only UPS subsystems 112, 113 are operational, relays 171 and 172 and switches 181, 183, and 184 are open, disconnecting UPS subsystem 111 from the AC input 102 (i.e., UPS subsystem 111 will not generate any output power in this configuration). Relay 173 is closed to conduct phase B of the AC input 102 to converter 143. Relay 174 is closed to conduct phase C of the AC input 102 to converter 144. Relay 175 is closed to conduct phase C of the AC input 102 to converter 145. Relay 176 is closed to conduct phase A of the AC input 102 to converter 146. Thus, in this configuration, the UPS 100 operates in a manner similar to that of the embodiment of FIG. 2, wherein each phase A, B, C of the AC input 102 is equally loaded (i.e., 3.33 KW each) across the two operational UPS subsystems 112, 113.

As shown in Table 5 above, the relays 171, 172, 173, 174 and switches 181, 183, 184 can be configured in various combinations to configure the UPS 100 for operation in various modes. Table 6 shows the total power output by the UPS 100 in several exemplary modes of operation when drawing power from one or more phases A, B, C of the AC input 102. In a first mode of operation, all three UPS subsystems 111, 112 and 113 are operational and three

TABLE 5

Three-phase input, single-phase output, three UPS subsystems.

| | Relay 171 | Relay 172 | Relay 173 | Relay 174 | Relay 175 | Relay 176 | Switch 181 | Switch 183 | Switch 184 |
|---|---|---|---|---|---|---|---|---|---|
| UPS Subsystems 111, 112 & 113 | C | O | C | O | C | O | C | C | C |
| UPS Subsystems 112 & 113 only | O | O | C | C | C | C | O | O | O |

C = Closed; O = Open.

In the example shown in Table 5, when all UPS subsystems 111, 112, 113 are operational, relay 171 is closed to conduct phase A of the AC input 102 to converter 141, phases of the AC input 102 are used; in a second mode of operation, only UPS subsystems 112 and 113 are operational yet all three phases of the AC input 102 are still used.

TABLE 6

Total power output for UPS having three 5 KVA subsystems.

|  | UPS subsystems 111, 112 & 113 operational | | | UPS subsystems 112 & 113 only operational | | |
|---|---|---|---|---|---|---|
| UPS 100 Output Power | Phase A Power | Phase B Power | Phase C Power | Phase A Power | Phase B Power | Phase C Power |
| UPS subsystems 111 power output | 5 KW | 0 | 0 | 0 | 0 | 0 |
| UPS subsystem 112 power output | 0 | 5 KW | 5 KW | 0 | 3.33 KW | 1.66 KW |
| UPS subsystem 113 power output | 0 | 0 | 5 KW | 3.33 KW | 0 | 1.66 KW |
| Total load/phase | 5 KW | 5 KW | 5 KW | 3.33 KW | 3.33 KW | 3.33 KW |
| Total output | | 15 KW | | | 10 KW | |

C = Closed; O = Open.

To operate the UPS 100 in backup mode (i.e., drawing power from the battery 150), relays 191, 192, 193, 194, 195, 196 are switched to battery connections B+ and N, thus conducting power from the battery 150 to UPS subsystems 141, 142, 143, 144, 145, 146.

Figure 4:
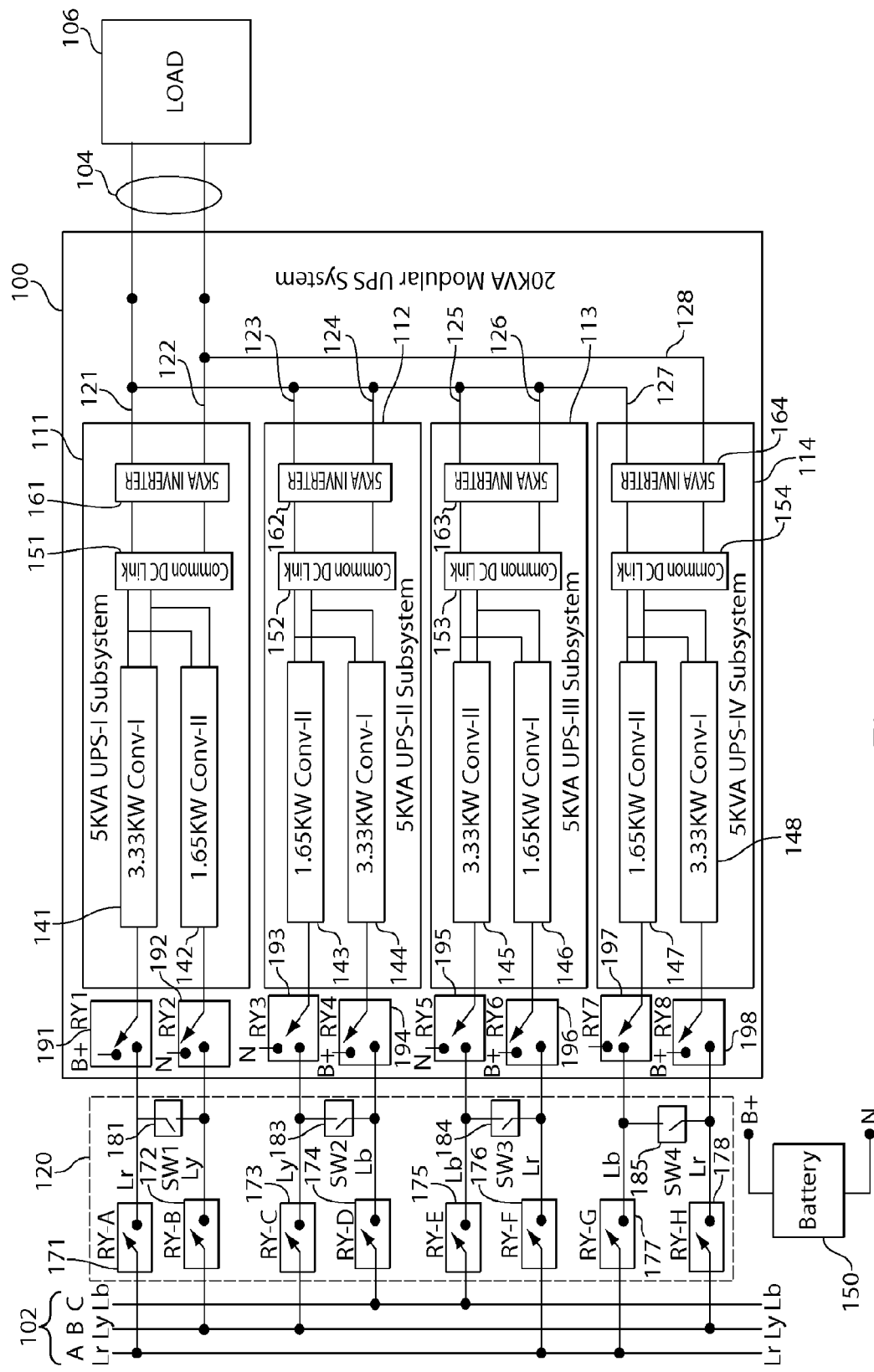
FIG. 4 is a block diagram of yet another example of an uninterruptible power supply in accordance with one embodiment.

FIG. 4 is a block diagram of the UPS system 100, according to another embodiment. The embodiment of FIG. 4 is similar to the embodiment of FIG. 3, except that the UPS system 100 includes four UPS subsystems 111, 112, 113, 114 instead of three UPS subsystems 111, 112, 113, as described above with respect to FIG. 3. UPS subsystem 114 includes two outputs, a line output 127 and a neutral output 128. The line outputs 121, 123, 125 and 127 are coupled together in parallel, as are the neutral outputs 122, 124, 126 and 128 to output 104. As discussed above, the load 106 may be coupled to the output 104.

Each of the UPS subsystems 111, 112, 113, 114 includes two single-phase converters (e.g., AC-to-DC power factor correction converters). Similar to the UPS subsystems 111, 112, 113 described above with respect to FIG. 3, UPS subsystem 114 includes single-phase converters 147 and 148 that are each coupled to a common DC bus 154. The DC bus 154 is further coupled to an inverter circuit 164. In one example, the UPS subsystem 114 may be configured to generate 5 KW at the outputs 127, 128 using a 3.33 KW converter (e.g., converter 148) and a 1.65 KW converter (e.g., converter 147). Since the outputs 121, 123, 125, 127 and 122, 124, 126, 128 are coupled in parallel, the total power output of the UPS 100 at the output 104 is up to 20 KW (i.e., 5 KW per UPS subsystem), depending on the operating mode of the UPS 100, which is described below.

In the embodiment of FIG. 4, the interconnect circuit 120 includes relays 177, 178 each coupled to one phase A, B or C of the AC input 102, in addition to relays 171, 172, 173, 174, 175, 176 as described above with respect to the embodiment of FIG. 3. For example, relay 177 is coupled to phase A and relay 178 is coupled to phase B. The interconnect circuit 120 further includes switch 185 in addition to switches 181, 183 and 185 as described above with respect to FIG. 3. Switch 185 is coupled between relay 177 and relay 178. Although in FIG. 4 the interconnect circuit 120 is shown separate from the UPS 100, in some embodiments the interconnect circuit 120 may be included within the UPS 100, such as described with respect to FIG. 1.

The UPS 100 of FIG. 4 further includes relays 197, 198 in addition to relays 191, 192, 193, 194, 195, 196 as described above with respect to FIG. 3. Relays 197, 198 are each coupled to a respective one of the converters 147, 148, to the interconnect circuit 120, and to the battery 150. Although in FIG. 4 the relays 191, 192, 193, 194, 195, 196, 197, 198 are shown within the UPS 100, in some embodiments relays 191, 192, 193, 194, 195, 196, 197, 198 may be included within the interconnect circuit 120.

The UPS 100 of FIG. 4 is configured such that each UPS subsystem 111, 112, 113, 114 shares generation of the total output power equally. For example, as described above, UPS subsystem 111 generates 5 KW, UPS subsystem 112 generates another 5 KW, UPS subsystem 113 generates another 5 KW, and UPS subsystem 114 generates yet another 5 KW for a total power output of 20 KW when UPS subsystems 111, 112, 113, 114 are all operational. When operating in line mode (i.e., drawing power from the AC input 102), the 20 KW output power can be derived from all three phases A, B, C of the AC input 102. When operating in backup mode (i.e., drawing power from the battery 150), the 20 KW output power can be derived from the battery 150. To achieve the above-described conditions, the interconnect circuit 120 may be controlled, for example, as shown in Table 7 below to selectively couple the UPS 100 to the AC input 102.

TABLE 7

Three-phase input, single-phase output, four UPS subsystems.

|  | R 171 | R 172 | R 173 | R 174 | R 175 | R 176 | R 177 | R 178 | S 181 | S 183 | S 184 | S 185 |
|---|---|---|---|---|---|---|---|---|---|---|---|---|
| UPS subsystems 111, 112, 113 & 114 | C | C | C | C | C | C | C | C | O | O | O | O |
| UPS subsystems 112, 113 & 114 only | O | O | C | O | C | O | C | O | O | C | C | C |

C = Closed; O = Open.

In the example shown in Table 7, when all UPS subsystems 111, 112, 113, 114 are operational, relay 171 is closed to conduct phase A of the AC input 102 to converter 141, relay 172 is closed to conduct phase B of the AC input 102 to converter 142 (switch 181 is open), relay 173 is closed to conduct phase B of the AC input 102 to converter 143, relay 174 is closed to conduct phase C of the AC input 102 to converter 144 (switch 183 is open), relay 175 is closed to conduct phase C of the AC input 102 to converter 145, relay 176 is closed to conduct phase A of the AC input 102 to converter 146 (switch 184 is open), relay 177 is closed to conduct phase A of the AC input 102 to converter 147, and relay 178 is closed to conduct phase B of the AC input 102 to converter 148 (switch 185 is open). When configured in the manner described in Table 7, each phase A, B, C of the AC input 102 is equally loaded (i.e., 3.33 KW each) across the four UPS subsystems 111, 112, 113, 114. It will be understood that the control configurations shown in Table 7 describe one non-limiting example of how the interconnection circuit 120 may be configured to achieve various operating conditions of the UPS 100, and that other configurations not shown in Table 7 are possible.

The UPS 100 is also configured to provide partial power supply redundancy at the output 104 if one of the UPS subsystems 111, 112, 113 or 114 fails. For example, if UPS subsystem 111 fails, the UPS 100 can provide 15 KW of output power (i.e., three-fourths of the total output capacity of the UPS 100) using only UPS subsystems 112, 113, 114.

When only UPS subsystems 112, 113, 114 are operational, relays 171 and 172 and switch 181 are open, disconnecting UPS subsystem 111 from the AC input 102 (i.e., UPS subsystem 111 will not generate any output power in this configuration). Relay 173 is closed to conduct phase B of the AC input 102 to converter 143. Switch 183 is closed to conduct phase B of the AC input 102 to converter 144. Relay 175 is closed to conduct phase C of the AC input 102 to converter 145. Switch 184 is closed to conduct phase C of the AC input 102 to converter 146. Relay 177 is closed to conduct phase A of the AC input 102 to converter 147. Switch 185 is closed to conduct phase A of the AC input 102 to converter 148. Thus, in this configuration, the UPS 100 operates in a manner similar to that of the embodiment of FIG. 3, wherein each phase A, B, C of the AC input 102 is equally loaded (i.e., 3.33 KW each) across the three operational UPS subsystems 112, 113, 114.

As shown in Table 7 above, the relays 171, 172, 173, 174, 175, 176 and switches 181, 183, 184, 185 can be configured in various combinations to configure the UPS 100 for operation in various modes. Table 8 shows the total power output by the UPS 100 in several exemplary modes of operation when drawing power from one or more phases A, B, C of the AC input 102. In a first mode of operation, all four UPS subsystems 111, 112, 113 and 114 are operational and three phases of the AC input 102 are used; in a second mode of operation, only UPS subsystems 112, 113 and 114 are operational yet all three phases of the AC input 102 are still used.

TABLE 6

Total power output for UPS having four 5 KVA subsystems.

|  | UPS subsystems 111, 112 & 113 operational | | | UPS subsystems 112 & 113 only operational | | |
| --- | --- | --- | --- | --- | --- | --- |
| UPS 100 Output Power | Phase A Power | Phase B Power | Phase C Power | Phase A Power | Phase B Power | Phase C Power |
| UPS subsystems 111 power output | 3.33 KW | 1.66 KW | 0 | 0 | 0 | 0 |
| UPS subsystem 112 power output | 0 | 1.66 KW | 3.33 KW | 0 | 5 KW | 0 |
| UPS subsystem 113 power output | 1.66 KW | 0 | 3.33 KW | 0 | 0 | 5 KW |
| UPS subsystem 114 power output | 1.66 KW | 3.33 KW | 0 | 5 KW | 0 | 0 |
| Total load/phase | 6.66 KW | 6.66 KW | 6.66 KW | 5 KW | 5 KW | 5 KW |
| Total output | | 20 KW | | | 15 KW | |

C = Closed; O = Open.

To operate the UPS 100 in backup mode (i.e., drawing power from the battery 150), relays 191, 192, 193, 194, 195, 196, 197, 198 are switched to battery connections B+ and N, thus conducting power from the battery 150 to UPS subsystems 141, 142, 143, 144, 145, 146, 147, 148.

One embodiment includes a modular UPS system with a three-phase power input. The UPS system includes a plurality of modules, or subsystems, and is configured to achieve high efficiency, partial redundancy, lower cost, higher power density, high flexibility and low input current distortion compared to some conventional UPS systems. The UPS system according to various embodiments are highly flexible and scalable in power, thus providing benefits of building higher power UPS systems at the lower cost and with unity power factor. Various embodiments of the UPS system are also capable operating in backup or battery mode using a single battery instead of a split battery, making the UPS system less complex, more cost effective, and easy to configure in parallel with other UPS systems or subsystems.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series internal or external to a UPS.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. For example, each UPS subsystem may include conventional PFC converter topologies. This may enable the UPS system to achieve high efficiency at a low cost. In another example, the power ratings of each UPS subsystem may be different than those described herein, thereby providing different total output power and different levels of redundancy for a given configuration of the UPS system. In yet another example, each UPS subsystem may include more than two AC-to-DC converters, e.g., three 1.66 KW converters each having their outputs coupled in parallel. Accordingly, the foregoing description and drawings are by way of example only.

What is claimed is:

1. An uninterruptible power supply (UPS) system, comprising:
    an interconnect circuit configured to receive three-phase AC input power from a three-phase AC power source;
    a first UPS subsystem coupled to the interconnect circuit and having a first single-phase AC-to-DC converter, a second single-phase AC-to-DC converter and a first output configured to provide a first single-phase AC output power, the first UPS subsystem configured to convert at least one phase of the three-phase AC input power into the first single-phase AC output power;
    at least one second UPS subsystem coupled to the interconnect circuit and having a third single-phase AC-to-DC converter, a fourth single-phase AC-to-DC converter and a second output configured to provide a second single-phase AC output power, the at least one second UPS subsystem configured to convert at least one phase of the three-phase AC input power into the second single-phase AC output power; and
    a third output coupled to the first output and the second output, the third output configured to provide a combination of the first single-phase AC output power and the second single-phase AC output power to a load,
    wherein, in a first mode of operation, the interconnect circuit is configured to conduct a first phase of the three-phase AC input power to the first UPS subsystem and a second phase of the three-phase AC input power to the at least one second UPS subsystem, and
    wherein, in a second mode of operation, the interconnect circuit is configured to disconnect the three-phase AC input power from the first UPS subsystem and is selectively configurable to conduct each and any phase of the three-phase AC input power to the third single-phase AC-to-DC converter and the fourth single-phase AC-to-DC converter of the at least one second UPS subsystem.

2. The UPS system of claim 1, wherein, in the first mode of operation, the interconnect circuit is further configured to conduct, to the first UPS subsystem, the second phase of the three-phase AC input power that is different than the first phase of the three-phase AC input power, and to conduct, to the at least one second UPS subsystem, a third phase of the three-phase AC input power that is different than each of the first and second phases of the AC input power.

3. The UPS system of claim 1, wherein each of the first single-phase AC-to-DC converter and the second single-phase AC-to-DC converter are configured to operate independently of each of the third single-phase AC-to-DC converter and the fourth single-phase AC-to-DC converter.

4. The UPS system of claim 1, further comprising a controller configured to detect a failure of the first UPS subsystem and operate the at least one second UPS system in the second mode of operation responsive to detecting the failure of the first UPS subsystem.

5. The UPS system of claim 1, further comprising a DC power source,
    wherein the first UPS subsystem includes a first input coupled to the first single-phase AC-to-DC converter and a second input coupled to the second single-phase AC-to-DC converter,
    wherein the at least one second UPS subsystem includes a third input coupled to the third single-phase AC-to-DC converter and a fourth input coupled to the fourth single-phase AC-to-DC converter, and
    wherein the interconnect circuit is configured to switchably connect the first input of the first UPS subsystem to one of the DC power source and at least one phase of the three-phase AC input power, the second input of the first UPS subsystem to one of the DC power source and at least one phase of the three-phase AC input power, the third input of the at least one second UPS subsystem to one of the DC power source and at least one phase of the three-phase AC input power, and the fourth input of the at least one second UPS subsystem to one of the DC power source and at least one phase of the three-phase AC input power.

6. The UPS system of claim 1, wherein the first output and the second output are coupled to each other in parallel.

7. The UPS system of claim 1, wherein the first UPS subsystem includes a first double-conversion UPS, and wherein the at least one second UPS subsystem includes a second double-conversion UPS.

8. An uninterruptible power supply (UPS) system, comprising:
    a first UPS subsystem having a first input, a second input, a first single-phase AC-to-DC converter coupled to the first input, and a second single-phase AC-to-DC converter coupled to the second input;
    a second UPS subsystem having a third input, a fourth input, a third single-phase AC-to-DC converter coupled to the third input, and a fourth single-phase AC-to-DC converter coupled to the fourth input;
    a first relay coupled to the first input and configured to be coupled to a first phase of a three-phase AC power source;
    a second relay coupled to the second input and configured to be coupled to a second phase of the three-phase AC power source;

a third relay coupled to the third input and configured to be coupled to the second phase of the three-phase AC power source;
a fourth relay coupled to the fourth input and configured to be coupled to a third phase of the three-phase AC power source;
a first switch coupled at one end to a first point between the first relay and the first input, and at an opposite end to a second point between the second relay and the second input, the first switch selectively configurable to couple the first point to the second point, provide the first phase of the three-phase AC power source to the second input, and provide the second phase of the three-phase AC power source to the first input; and
a second switch coupled at one end to a third point between the third relay and the third input, and at an opposite end to a fourth point between the fourth relay and the fourth input, the second switch selectively configurable to couple the third point to the fourth point, provide the second phase of the three-phase AC power source to the fourth input, and provide the third phase of the three-phase AC power source to the third input.

9. The UPS system of claim 8, further comprising a fifth relay interposed between the first input and the first switch, a sixth relay interposed between the second input and the first switch, a seventh relay interposed between the third input and the second switch, and an eighth relay interposed between the fourth input and the second switch.

10. The UPS system of claim 9, further comprising a DC power source, wherein the fifth relay is configured to switchably couple the first single-phase AC-to-DC converter to one of the DC power source and at least one phase of the three-phase AC power source, wherein the sixth relay is configured to switchably couple the second single-phase AC-to-DC converter to one of the DC power source and at least one phase of the three-phase AC power source, wherein the seventh relay is configured to switchably couple the third single-phase AC-to-DC converter to one of the DC power source and at least one phase of the three-phase AC power source, and wherein the eighth relay is configured to switchably couple the fourth single-phase AC-to-DC converter to one of the DC power source and at least one phase of the three-phase AC power source.

11. The UPS system of claim 10, further comprising a controller coupled to the first, second, third, fourth, fifth, sixth, seventh and eighth relays, the first and second switches, and the first and second UPS subsystems,
wherein, in a first mode of operation, the controller is configured to close the first, second, third, and fourth relays to provide at least one phase of three-phase AC input power to the first, second, third and fourth inputs, respectively, wherein the controller is further configured to switch the fifth relay to couple the first single-phase AC-to-DC converter to the first relay, switch the sixth relay to couple the second single-phase AC-to-DC converter to the second relay, switch the seventh relay to couple the third single-phase AC-to-DC converter to the third relay, switch the eighth relay to couple the fourth single-phase AC-to-DC converter to the fourth relay, and open the first switch and the second switch; and
wherein, in a second mode of operation, the controller is configured to open the first, second and third relays, open the first switch, close the fourth relay, and close the second switch.

12. The UPS system of claim 11, wherein, in a third mode of operation, the controller is configured to open the first and second relays, open the first and second switches, and close the third and fourth relays.

13. The UPS system of claim 12, wherein the controller is further configured to detect a failure of the first UPS subsystem and operate the UPS system in one of the second and third modes of operation in response to detecting the failure of the first UPS subsystem.

14. The UPS system of claim 10, further comprising a third switch coupled at one end to the second point and at an opposite end to the third point.

15. The UPS system of claim 14, further comprising a controller coupled to the first, second, third, fourth, fifth, sixth, seventh and eighth relays, the first, second and third switches, and the first and second UPS subsystems,
wherein, in a first mode of operation, the controller is configured to close the first relay and close the first, second and third switches to provide one phase of the three-phase AC input power to the first, second, third and fourth inputs, respectively, wherein the controller is further configured to switch the fifth relay to couple the first single-phase AC-to-DC converter to the first relay, switch the sixth relay to couple the second single-phase AC-to-DC converter to the second relay, switch the seventh relay to couple the third single-phase AC-to-DC converter to the third relay, switch the eighth relay to couple the fourth single-phase AC-to-DC converter to the fourth relay; and
wherein, in a second mode of operation, the controller is configured to open the first, second and third relays, open the third switch, close the fourth relay, and close the second switch.

16. The UPS system of claim 8, wherein the first single-phase AC-to-DC converter includes a first 3.33 KW AC-to-DC converter, wherein the second single-phase AC-to-DC converter includes a first 1.66 KW AC-to-DC converter, wherein the third single-phase AC-to-DC converter includes a second 1.66 KW AC-to-DC converter, and wherein the fourth single-phase AC-to-DC converter includes a second 3.33 KW AC-to-DC converter.

17. The UPS system of claim 16, wherein the first UPS subsystem includes a first 5KW inverter coupled to each of the first and second single-phase AC-to-DC converters, and wherein the second UPS subsystem includes a second 5 KW inverter coupled to each of the third and fourth single-phase AC-to-DC converters.

18. A method of controlling an uninterruptible power supply (UPS) system, the method comprising:
connecting a first phase of a three-phase AC input power to a first single-phase AC-to-DC converter of a first UPS subsystem;
connecting a second phase of the three-phase AC input power, different than the first phase, to a second single-phase AC-to-DC converter of the first UPS subsystem;
connecting the second phase of the three-phase AC input power to a third single-phase AC-to-DC converter of a second UPS subsystem;
connecting a third phase of the three-phase AC input power, different than the first and second phases, to a fourth single-phase AC-to-DC converter of the second UPS subsystem;
converting the three-phase AC input power into a single-phase AC output power using each of the first, second, third and fourth AC-to-DC converters;
detecting a failure of the first UPS subsystem; and responsive to detecting the failure of the first UPS subsystem, disconnecting the three-phase AC input power from each of the first single-phase AC-to-DC converter and the second single-phase AC-to-DC converter, connecting at least one of the first phase of the three-phase AC input power and the second phase of the three-phase AC input power to each of the third single-phase AC-to-DC converter and the fourth single-phase AC-to-DC converter, and converting at least one phase of the three-phase AC input power into the single-phase AC output power using each of the third and fourth single-phase AC-to-DC converters.

19. The method of claim 18, further comprising connecting one phase of the three-phase AC input power to each of the first, second, third and fourth single-phase AC-to-DC converters.

* * * * *